United States Patent
Kamal et al.

(10) Patent No.: US 10,873,853 B2
(45) Date of Patent: Dec. 22, 2020

(54) SYSTEMS AND METHODS FOR MANAGING DIGITAL IDENTITIES ASSOCIATED WITH USERS

(71) Applicant: MASTERCARD INTERNATIONAL INCORPORATED, Purchase, NY (US)

(72) Inventors: Ashfaq Kamal, Stamford, CT (US); Charles Walton, Marshfield, MA (US); Robert D. Reany, New Canaan, CT (US)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 11 days.

(21) Appl. No.: 16/280,664

(22) Filed: Feb. 20, 2019

(65) Prior Publication Data
US 2019/0261169 A1   Aug. 22, 2019

Related U.S. Application Data (60) Provisional application No. 62/633,476, filed on Feb. 21, 2018.

(51) Int. Cl.
*H04M 1/66* (2006.01)
*H04W 12/00* (2009.01)
(Continued)

(52) U.S. Cl.
CPC ..... *H04W 12/0027* (2019.01); *H04L 63/0807* (2013.01); *H04L 63/102* (2013.01);
(Continued)

(58) Field of Classification Search
CPC .......... H04L 63/08; H04L 9/32; H04W 12/06; H04W 12/0608; H04W 12/12; G06F 21/64; G06F 21/31
See application file for complete search history.

(56) References Cited

U.S. PATENT DOCUMENTS 7,493,497 B1 * 2/2009 Tan, Jr. ................ G06F 21/602
                                                     380/277
9,100,171 B1 * 8/2015 Peterson ............... H04L 9/3268
(Continued)

FOREIGN PATENT DOCUMENTS

JP    2003-224554    8/2003
JP    2016-192126    11/2016

OTHER PUBLICATIONS

Sapelova, Svetlan et al., Privacy Issues in 1-16 Cross-Border Identity Management Systems: Pan-European Case; retrieved May 9, 2019 online; hhtps://hal.archives-ouvertes.fr/hal-01276076/document; 10 pgs.

*Primary Examiner* — Shantell L Heiber
(74) *Attorney, Agent, or Firm* — Harness, Dickey & Pierce, P.L.C.

(57) ABSTRACT

Systems and methods are provided for managing digital identities in multiple regions, through multiple identity providers, while providing for policy enforcement in connection with the digital identities. One exemplary method includes receiving, at an identity and access management hub (IAMH) in a first region, a request related to a digital identity from a secondary hub disposed in a second region and checking a policy associated with the digital identity. In response, the IAMH solicits at least one claim from a user, at a relying party application and/or website, based on the request and provides the at least one claim to a value-added service associated with the IAMH for verification of the at least one claim. The IAMH then transmits a result of the verification to the relying party associated with the request and provides a token, in response to the request, to a secure resource associated with the relying party.

16 Claims, 6 Drawing Sheets

(51) Int. Cl.

| | |
|---|---|
| *H04W 12/12* | (2009.01) |
| *H04W 12/06* | (2009.01) |
| *H04W 12/02* | (2009.01) |
| *H04L 29/06* | (2006.01) |
| *H04W 12/08* | (2009.01) |
| *H04W 84/04* | (2009.01) |

(52) U.S. Cl.
CPC ........... *H04L 63/20* (2013.01); *H04W 12/004* (2019.01); *H04W 12/02* (2013.01); *H04W 12/06* (2013.01); *H04W 12/08* (2013.01); *H04W 12/12* (2013.01); *H04W 84/042* (2013.01)

(56) References Cited

U.S. PATENT DOCUMENTS

| | | | |
|---|---|---|---|
| 10,255,419 B1* | 4/2019 | Kragh | H04L 63/0861 |
| 2009/0271856 A1* | 10/2009 | Doman | G06F 21/33 |
| | | | 726/9 |
| 2010/0100945 A1* | 4/2010 | Ozzie | G06Q 20/40 |
| | | | 726/5 |
| 2015/0332029 A1* | 11/2015 | Coxe | H04L 63/06 |
| | | | 726/9 |
| 2016/0057168 A1* | 2/2016 | Reddock | H04L 63/0263 |
| | | | 726/1 |
| 2017/0250972 A1* | 8/2017 | Ronda | H04L 9/08 |
| 2017/0353311 A1* | 12/2017 | Schukai | H04L 9/0618 |
| 2018/0075527 A1* | 3/2018 | Nagla | G06Q 40/025 |

\* cited by examiner

SYSTEMS AND METHODS FOR MANAGING DIGITAL IDENTITIES ASSOCIATED WITH USERS

CROSS-REFERENCE TO RELATED APPLICATION

This application claims the benefit of and priority to U.S. Patent Application No. 62/633,476 filed Feb. 21, 2018. The entire disclosure of the above application is incorporated herein by reference.

FIELD

The present disclosure is generally directed to systems and methods for managing digital identities associated with users and, in particular, to systems and methods for managing digital identities in multiple regions, through multiple identity providers, while providing for policy enforcement in connection with the digital identities.

BACKGROUND

This section provides background information related to the present disclosure which is not necessarily prior art.

People are known to be associated with a variety of different types of accounts, including email accounts, bank accounts, and payment accounts, to name a few. In connection with opening the accounts or being authenticated or authorized for access to the accounts, each person (broadly, a user) is identified to or confirmed to his/her identity. For example, when a person opens an account with a banking institution, the banking institution typically requires the person to present identification, often in the form of a driver's license or other government issued document, prior to opening the account, in order to establish or confirm the identity of that person.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Exemplary embodiments will now be described more fully with reference to the accompanying drawings. The description and specific examples included herein are intended for purposes of illustration only and are not intended to limit the scope of the present disclosure.

When users attempt to apply for accounts, or access accounts (e.g., for use in a transaction, etc.), the users are authenticated or authorized, or otherwise identified, to identities of the users (i.e., as authorized users). This may be accomplished through physical identifying documents, or digital identities. Digital identities are typically provided from or by identity providers (IDPs). Use of the digital identities, then, is often subject to policies which may vary from region to region. Uniquely, the systems and methods herein manage digital identities of users in multiple regions, through multiple IDPs, while providing for policy enforcement (e.g., region specific enforcement, general enforcement, etc.) in connection with use of the digital identities. In particular, a cloud-based hub, or an identity and access management hub (IAMH), is coupled to and in communication with various IDPs, each of which includes multiple digital identities. The IDPs, generally, are in multiple different regions. And, the IAMH includes secondary hubs, which are included "on-soil" in the multiple different regions, in communication with the different IDPs. Policy management, then, is included in the IAMHs and/or the secondary hubs associated therewith to ensure adherence to applicable policies. The IAMHs further offer value-added services, which may be related or unrelated to the digital identities provided therethrough. Such value-added services may include, for example, biometric authentication, fraud/confidence scoring, document verification and/or proofing, etc. In this manner, a comprehensive solution for digital identity services may be provided through the IAMHs, in connection with the secondary hubs disposed in different regions, while providing value-added services and adherence to polices associated with digital identities and personal identifying information included therein (e.g., across the different regions, etc.).

Figure 1:
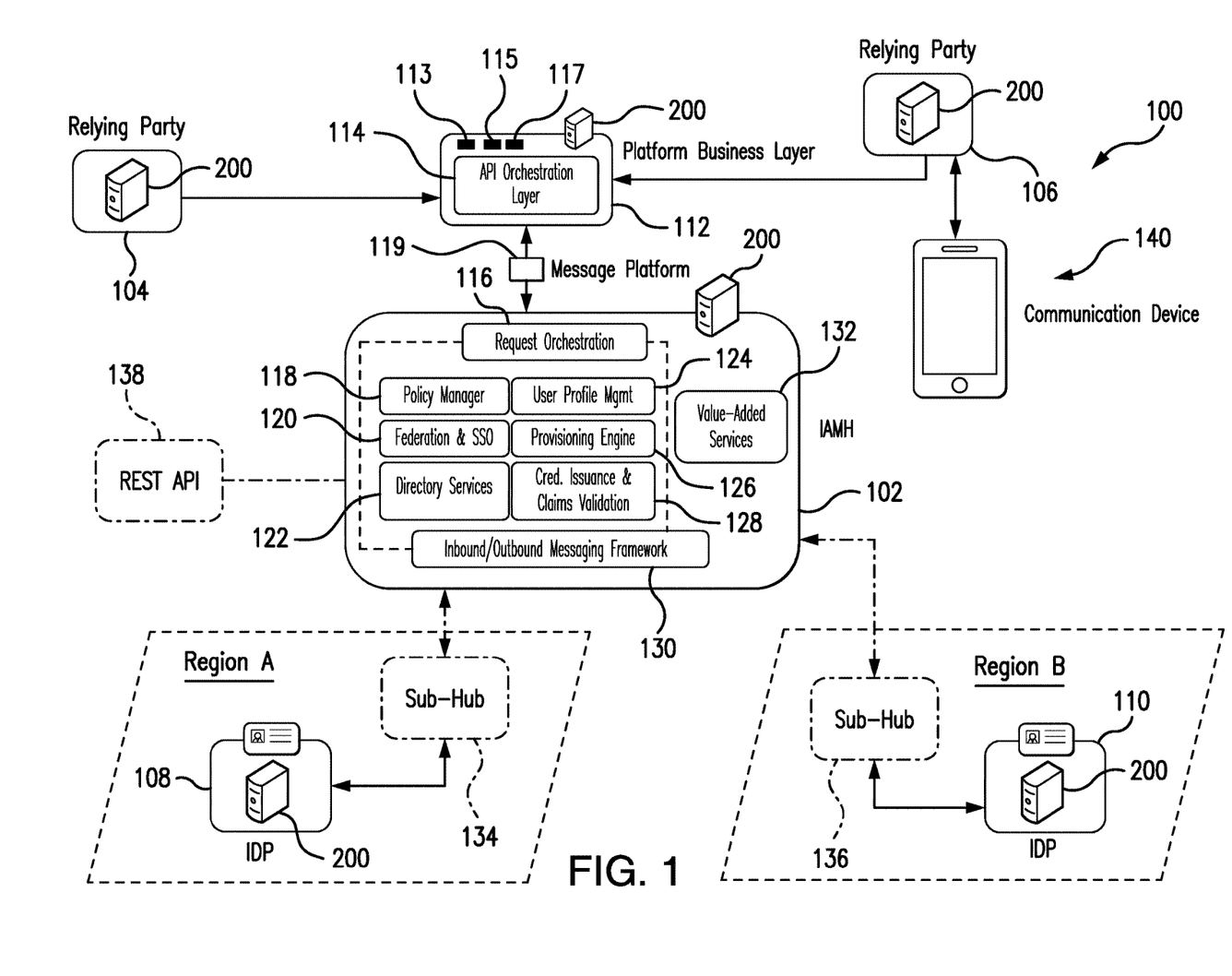
FIG. 1 illustrates an exemplary system of the present disclosure suitable for use in managing digital identities of users in multiple regions, through multiple identity providers, while providing for policy enforcement in connection with the digital identities and the management thereof.

FIG. 1 illustrates an exemplary system 100, in which one or more aspects of the present disclosure may be implemented. Although the system 100 is presented in one arrangement, other embodiments may include the parts of the system 100 (or other parts) arranged otherwise depending on, for example, different region determinations and/or IDPs therein, different hub architectures, relying parties' access to the hubs associated with the IDPs, the particular regions included, particular privacy policies at issue (e.g., privacy requirements, data management requirements, etc.), etc.

The system 100 generally includes an identity and access management hub (IAMH) 102, which is provided in the cloud, as a cloud-based service, whereby the IAMH 102 and its services are a tenant of the cloud computing device (i.e., one or more networked computing devices, etc.). The IAMH 102 is coupled to multiple relying parties 104 and 106 and to multiple IDPs 108 and 110. The IAMH 102, the relying parties 104 and 106, and the IDPs 108 and 110 each includes a computing device 200, which is shown in detail in FIG. 2 (and described in more detail hereinafter).

In this exemplary embodiment, the relying parties 104 and 106 may include, for example, any entity and/or person that intends to rely on an identity of a user for one or more purposes. The entity or person may include banking institutions, investment institutions, merchants, telecommunication providers, medical providers, insurance providers, government entities, payment network, etc. The one or more purposes may relate to one or more business arrangements and/or interactions, whereby the user is authenticated or authorized thereto (e.g., authenticated to a payment account, etc.). More generally, the replying parties 104 and 106 herein are configured to consume the digital identity services associated with the IAMH 102 and IDPs 108 and 110 described herein.

In connection therewith, the relying parties 104 and 106 may host claims-based applications/sites, where a claim is a statement an entity or user makes about itself in order to establish access. As shown, each of the relying parties 104 and 106, again, includes a computing device 200, which is shown in detail in FIG. 2 (and described in more detail hereinafter). In this exemplary embodiment, the relying party 104 includes a merchant, and specifically, a merchant website at which a user may attempt a payment account transaction, and the relying party 106 is a different merchant, which offers a mobile application for interaction with the merchant, which is installed and active at a communication device (e.g., communication device 140, etc.) associated with a user. Each of the relying parties 104 and 106 may request, from the IAMH 102, authentication, authorization, and/or confirmation of the particular user interacting therewith (or an attribute of the user's identity, or an account associated therewith), or also return of an attribute of the user's identity.

Further, the IDPs 108 and 110 are configured to provide and/or offer digital identity services, whereby the IDPs are configured to create, acquire, manage, maintain, and/or store the digital identities for access, while providing authentication services to the relying parties 104 and 106, as described herein. The IDPs 108 and 110 may be standalone services and/or entities. Additionally, or alternately, the IDPs 108 and 110 may be incorporated, in whole or in part, with other entities, such as, for example, a payment network or a banking institution, etc. In one specific example, a security assertion markup language (SAML) IDP is configured to issue a SAML authentication assertion against a standard based and/or defined SAML profile, while an OpenID IDP is configured to provide identity tokens (as described below) having a JavaScript Object Notation (JSON) format. As shown, each of the IDPs 108 and 110, again, includes a computing device 200, which is shown in detail in FIG. 2 (and described in more detail hereinafter).

With continued reference to FIG. 1, the IAMH 102 is configured as a cloud-based hub (e.g., offered in the Microsoft® Azure® Cloud, etc.) and includes and/or is associated with a platform business layer 112, which is configured to expose one or more API-based services to relying party websites, mobile applications, and/or software as a service (SaaS) applications. More particularly, the IAMH 102 includes a cloud agnostic proxy to core identity and access management micro services, for example, provided by a payment network (e.g., Mastercard® payment network, etc.), or other entities, etc. In connection therewith, the IAMH 102 is further configured to create and/or enable secondary or sub hubs (which may be copies or near copies of the IAMH 102) that are region (e.g., country, etc.) specific. The IAMH 102 is configured to further enable co-existence of multiple secondary or sub hubs for a given region, and/or to enable cross border hub communication with the secondary hubs through one or more messaging frameworks (e.g., a Mastercard® message framework, etc.).

The platform business layer 112 is configured to expose application programming interfaces (APIs), which are used by the relying party websites and mobile applications to request services such as fraud scoring, return of identity attribute data, and tokenization for digital identities, etc. Specifically, the platform business layer 112 is configured to expose, for example, an API to request identity verification and/or authentication, an API to request fraud scoring, an API to request identifying document verification, an API to request new account opening, and other suitable APIs consistent with the description herein. It should be appreciated that, as shown in FIG. 1, the platform business layer 112 includes a computing device 200, which is again shown in detail in FIG. 2 (and described in more detail hereinafter).

The APIs associated with the platform business layer 112 provide relying party applications (e.g., mobile applications provided by or on behalf of a relying party and for use by a user, etc.) with an abstract interface to communicate policies and exchange claims with the IAMH 102 for user authentication and/or authorization (e.g., claims such as name, mailing address, age, social security number, etc.). The IAMH 102 is configured, more generally, to provide identity as a service (IDaaS) services (through interactions with the IDPs 108 and 110), thereby permitting developers of the relying parties 104 and 106 to focus on developing specific business objectives and/or functionality of the websites and applications, while interacting with the IAMH 102, through the business layer 112 to provide IDaaS.

In this exemplary embodiment, the platform business layer 112 includes an API orchestration layer 114, which is configured to bootstrap services to core network services (e.g., payment network services (e.g., tokenization, identity proofing, fraud scoring, etc.), etc.) and to provide one uniform response back to the given relying party 104 or 106. What's more, the API orchestration layer 114 is configured to impose policies, set by the relying parties 104 and 106, on incoming requests for digital identity related services, based on, for example, device and/or user data fraud scoring, etc. In one example, through the API orchestration layer 114, the IAMH 102 is configured to use a fraud score to decide how to handle consumer authentication related to such requests. If the fraud score satisfies a threshold (e.g., the fraud score is high, etc.), the IAMH 102 may be configured to decide to provide frictionless, risk-based authentication of the user without promoting the user for any explicit authentication. If the fraud score does not satisfied a threshold (e.g., the fraud score is low, etc.), the IAMH 102 may be configured to invoke multi-factor authentication (MFA) for the user.

Moreover, the platform business layer 112 includes a digital identity business layer 113, which integrates and/or interacts with the relying parties 104 and 106 and/or services related to the IAMH 102 and/or value-added services (e.g., tokenization, fraud scoring and key management services, etc.). The platform business layer 112 also includes an identity and access management micro service 115, which is configured as a cloud agnostic proxy to core identity and access management services provided through the IAMH 102, for example. And, the platform business layer 112 further includes a common network and fraud service 117, which provides common proxy to other networks and fraud services and which is configured to utilize shared services to provide improved and/or better latency and speed.

In general, in this exemplary embodiment, the platform business layer 112 is illustrated, implemented and/or embedded in the computing device 200, but may be provided as a cloud-based implementation or otherwise in other embodiments. What's more, the platform business layer 112 interacts with the IAMH 102 through a message platform 119, such as, for example, a payment network message platform (e.g., Mastercard® message platform, etc.).

With further reference to FIG. 1, the IAMH 102 includes multiple modules: a request orchestration 116, a policy manager 118 for enforcing the policies associated with the IAMH 102, whereby the policy manager 118 may be configured to define role based access control for tenants, to define user profiles and access privileges, and/or to define rules for access tokens for digital service (e.g., time to live, persistency, domain access control etc.); a federation and single sign-on (SSO) 120; directory services 122; a user profile management 124; a provisioning engine 126 for provisioning/de-provisioning users and business partners and also for creating tenants and users; a credit issuance and claims validation 128; and an inbound/outbound messaging framework 130.

The IAMH 102 also includes a module for value-added services 132, which includes a variety of services that may be employed in connection with the digit identity services provided through the IAMH 102. The value-added services 132 may include, without limitation, token services (e.g., Mastercard Digital Enablement Service (MDES), etc.); risk and/or fraud data scoring services; key management services (e.g., as related to encryption, signatures, etc.) configured to issue certificates for IDP authentication, to issue service access tokens, and/or to access credential(s) for directory services; API security services; ACH data services; identity proofing data services; biometric authentication services; authorization services; consent management services; opening banking services, etc. For example, and without limitation, where the relying party 104 includes personal identifying information (PII) data about multiple users, the relying party 104 may intend to tokenize at least a portion of the PII data using token services (broadly, one of the value-added services 132). Thereafter, the users may use a tokenized personal data store to make identity attribute claims to another IDP and/or relying party.

The IAMH 102 is referred to herein as the primary IAMH, through which the various services offered thereby (or modules associated therewith) are made available in multiple different regions (e.g., Region A and Region B in FIG. 1, etc.). In connection therewith, the primary IAMH 102 is configured to instantiate and/or create secondary hubs (or subsidiary/sub-hubs) that are dedicated to specific ones of the regions and located in those regions. In particular, the illustrated system 100 includes two secondary hubs 134 and 136, each of which is instantiated and/or created by the IAMH 102, and each of which is coupled to and/or in communication with the IAMH 102 and also the IDP 108 and the IDP 110, respectively. The secondary hub 134 is located and dedicated to Region A, while the secondary hub 136 is located and dedicated to Region B (where the IAMH 102 is understood to then be in a region that is different from Region A and Region B). It should be appreciated, however, that additional secondary hubs may be included in other system embodiments.

Even though cloud-based, the secondary hub 134 is determined to be "on-soil" in Region A, and the secondary hub 136 is determined to be "on-soil" in Region B, in that the hubs 134 and 136 are physically present within hardware located within the respective Regions A and B. The Regions A and B may be defined by different postal codes, states, territories, provinces, countries, unions, continents, or other geographic delineations, etc. Given the cross-region presence of the secondary hubs 134 and 136 (whereby each hub is located in a different region), the primary IAMH 102 may be configured to thereby enforce relying party policies related to a specific request (e.g., authentication, authorization, etc.) within the given one of the Regions A and B as appropriate (whereby the different Regions A and B may be associated with different policies, etc.). In this manner, the secondary hubs 134 and 136 are able to communicate data to the respective IDPs 108 and 110, even when local policies, or policies in general, prohibit off-soil data transactions. It should be appreciated that while only two IDPs are shown in FIG. 1, various IDPs may be located within the Regions A and B and be coupled to and/or in communication with the secondary hubs 134 and 136. In at least one embodiment, the secondary hubs 134 and 136 (and/or one or more additional secondary hubs) may be coupled to government and/or private sector services to access one or more IDPs associated therewith. The government services may, in one or more embodiments, define specification or identity assurance levels, security and privacy, trust framework and certification requirements, and guidelines for such services in general and/or within a region associated with the government.

With that said, in general, the secondary hubs 134 and 136 are copies of the IAMH 102 in the particular local regions (i.e., Regions A and B). The secondary hubs 134 and 136 may include as much, or as little, of the IAMH 102 as necessary, required or desired, in the given local region. For example, the secondary hub 134 may include an instantiation of the value-added services 132 (and each of the services associated therewith), including, for example, fraud data scoring in addition to the other value-added services mentioned above, while the secondary hub 136 may include an instantiation for only a portion of the value-added services 132, which does not include fraud data scoring services, such that the secondary hub 136 relies on the IAMH 102 for fraud scoring services (and other services as needed, or desired). It should be appreciated that the different hubs may include a variety of different components depending on, for example, different data policies associated with the different regions, availability of services, resource allocation for instantiations of services, etc.

Further, the IAMH 102 is configured to provide cross enterprise single sign on (SSO) and access control functions for relying party websites, mobile applications, and Cloud SaaS applications, through use of standards based protocols such as: security assertion markup language (SAML), OpenID Connect and/or OAUTH. What's more, the IAMH 102 includes and/or is associated with a Representational State Transfer (REST) API module 138 (indicated REST API in FIG. 1), by which the IAMH 102 is configured to interface with other REST-based interfaces to input and output data. In this manner, the REST API module 138 permits services internal to the IAMH 102 (e.g., document verification proofing services, etc.) to interface with other external services (e.g., Blockchain services, etc.) via REST-based interfaces exposed to the internal and external services.

It should be appreciated that each of the IAMH 102, the value added services 132 and/or the REST API module 138 includes an API tool set, which includes a pluggable API to on-board IDPs, data attribute providers and other services over one or more REST-based interfaces or other suitable interfaces.

Moreover, the communication device 140 in the system 100 is associated with a user (not shown) (e.g., where the communication device 140 is a personal device of the user, and not a publically available and/or shared device; etc.), who is associated with an identity. In general, the identity indicates and/or includes (without limitation) one or more attributes such as, for example, a name of the user, an address of the user, a birthdate for the user, contact information for the user, a social security number or other government identification number for the user, etc. The communication device 140 is illustrated in further detail in FIG. 3 (which is discussed in more detail below).

It should be appreciated that the IAMH 102 and the various parts of the system 100 shown in FIG. 1 are further configured to perform the operations that are described below with reference to the methods of FIGS. 4-6. In the description of the methods, it should be appreciated that the IAMH 102 and/or any of the secondary hubs 134 and 136 may be configured to perform the described operations. Additionally, at the outset of the methods described below, it should be appreciated that the IAMH 102 (inclusive of the platform business layer 112) and/or the secondary hubs 134 and 136 may impose and/or enforce the policies provided by the relying parties 104 and 106 and/or the IDPs 108 and 110 whereby privacy concerns, on-soil requirements, and/or other considerations related to the PII, digital identities, or other data included in the system is thereby accounted for and/or managed in connection with the exemplary methods. It should further be appreciated that the IAMH 102 and/or the secondary hubs 134 and 136 may be permitted to communicate and/or pass data, between one another, when not restricted by policies of the relying parties 104 and 106 and/or the IDPs 108 and 110 from doing so (as enforced thereby).

Figure 2:
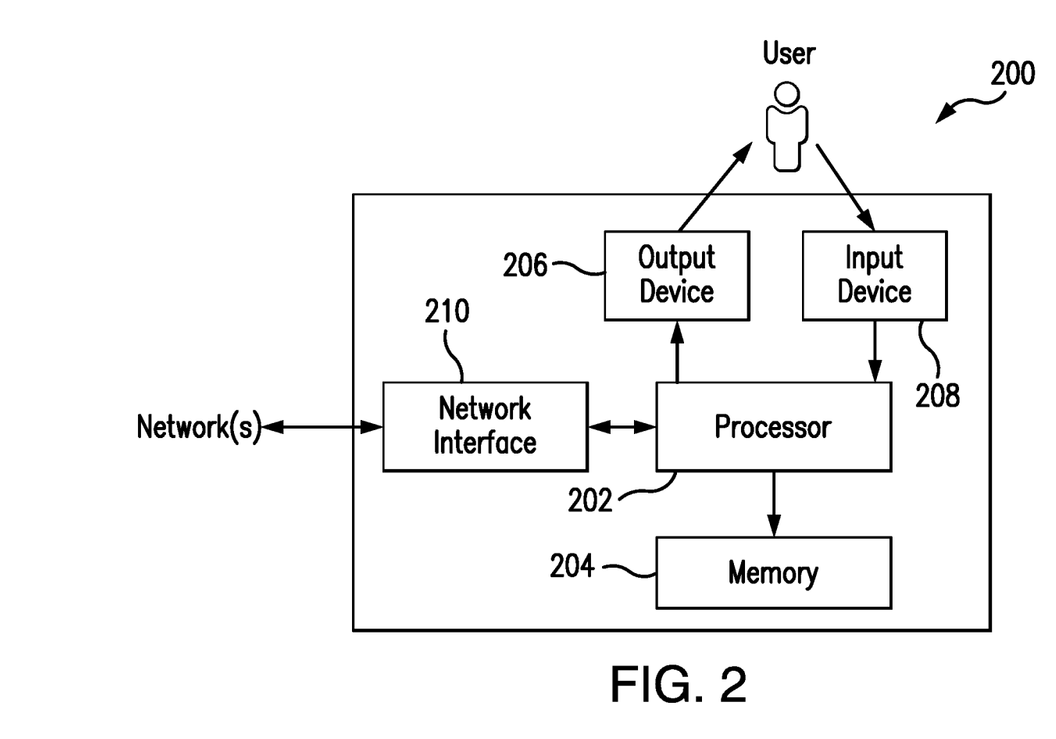
FIG. 2 is a block diagram of a computing device that may be used in the exemplary system of FIG. 1.

FIG. 2 illustrates an exemplary computing device 200 that can be used in the system 100 of FIG. 1. The computing device 200 may include, for example, one or more servers, workstations, personal computers, laptops, tablets, smartphones, etc. In addition, the computing device 200 may include a single computing device, or it may include multiple computing devices located in close proximity or distributed over a geographic region, so long as the computing devices are specifically configured to function as described herein. In the exemplary embodiment of FIG. 1, and as described above, the IAMH 102 (and/or subpart thereof), the relying parties 104 and 106, the IDPs 108 and 110, and the platform business layer 112 are each illustrated as including, or being implemented in, computing device 200, coupled to (and in communication with) one or more networks. In addition, the communication device 140 can also be considered a computing device (or as including a computing device) generally consistent with computing device 200 for purposes of the description herein. With that said, the system 100 should not be considered to be limited to the computing device 200, as described below, as different computing devices and/or arrangements of computing devices may be used in other embodiments. In addition, different components and/or arrangements of components may be used in other computing devices.

Referring to FIG. 2, the exemplary computing device 200 includes a processor 202 and a memory 204 coupled to (and in communication with) the processor 202. The processor 202 may include one or more processing units (e.g., in a multi-core configuration, etc.). For example, the processor 202 may include, without limitation, a central processing unit (CPU), a microcontroller, a reduced instruction set computer (RISC) processor, an application specific integrated circuit (ASIC), a programmable logic device (PLD), a gate array, and/or any other circuit or processor capable of the functions described herein.

The memory 204, as described herein, is one or more devices that permit data, instructions, etc., to be stored therein and retrieved therefrom. The memory 204 may include one or more computer-readable storage media, such as, without limitation, dynamic random access memory (DRAM), static random access memory (SRAM), read only memory (ROM), erasable programmable read only memory (EPROM), solid state devices, flash drives, CD-ROMs, thumb drives, floppy disks, tapes, hard disks, and/or any other type of volatile or nonvolatile physical or tangible computer-readable media. The memory 204 may be configured to store, without limitation, biometrics (e.g., facial images (e.g., selfies, etc.), fingerprints, etc.), biometric references, images, keys, key pairs, identity records, digital identities (and attributes thereof), policies, services information and data, and/or other types of data (and/or data structures) suitable for use as described herein. Furthermore, in various embodiments, computer-executable instructions may be stored in the memory 204 for execution by the processor 202 to cause the processor 202 to perform one or more of the operations described herein, such that the memory 204 is a physical, tangible, and non-transitory computer readable storage media. Such instructions often improve the efficiencies and/or performance of the processor 202 and/or other computer system components configured to perform one or more of the various operations herein. It should be appreciated that the memory 204 may include a variety of different memories, each implemented in one or more of the operations or processes described herein.

In the exemplary embodiment, the computing device 200 also includes an output device 206 that is coupled to (and in communication with) the processor 202. The output device 206 outputs information (e.g., prompts to provide biometrics, etc.), visually or audibly, for example, to a user of the computing device 200 (e.g., a user associated with the communication device 140, etc.), etc. And, various interfaces may be displayed at computing device 200, and in particular at output device 206, to display certain information. The output device 206 may include, without limitation, a presentation unit such as a liquid crystal display (LCD), a light-emitting diode (LED) display, an organic LED (OLED) display, an "electronic ink" display, etc., or speakers, other computing devices, etc. In some embodiments, output device 206 may include multiple devices.

In addition, the computing device 200 includes an input device 208 that receives inputs from the user (i.e., user inputs) of the computing device 200 such as, for example, images of physical documents, images of the user (e.g., facial images, etc.), and/or biometrics for the user, etc., in response to prompts from the mobile application, as further described below. The input device 208 may include a single input device or multiple input devices. The input device 208 is coupled to (and is in communication with) the processor 202 and may include, for example, one or more of a keyboard, a pointing device, a mouse, a stylus, a camera, a biometric reader (e.g., fingerprint scanner, etc.), a touch sensitive panel (e.g., a touch pad or a touch screen, etc.), another computing device, and/or an audio input device. In various exemplary embodiments, a touch screen, such as that included in a tablet, a smartphone, or similar device, may behave as both the output device 206 and an input device 208.

Further, the illustrated computing device 200 also includes a network interface 210 coupled to (and in communication with) the processor 202 and the memory 204. The network interface 210 may include, without limitation, a wired network adapter, a wireless network adapter (e.g., an NFC adapter, a radio-frequency (RF) adapter, a Bluetooth adapter, etc.), a mobile network adapter, or other device capable of communicating to one or more different ones of the networks herein and/or with other devices described herein. Further, in some exemplary embodiments, the computing device 200 may include at least one processor (e.g., the processor 202, etc.), at least one memory (e.g., the memory 204, etc.), and/or one or more network interfaces (e.g., network interface 210, etc.) included in, or incorporated into or with the at least one processor.

Figure 3:
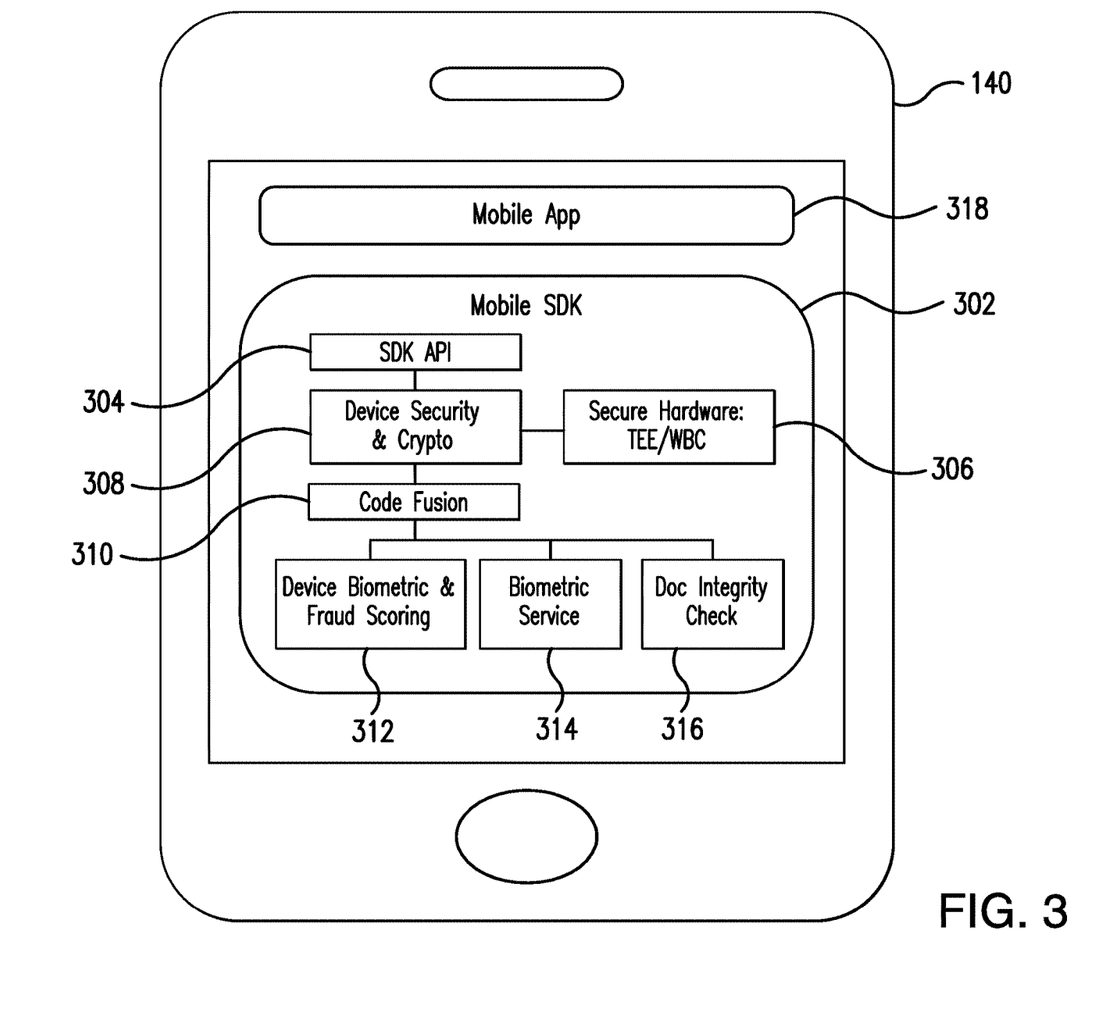
FIG. 3 is a block diagram of a communication device that may be used in the exemplary system of FIG. 1, which is generally consistent with the computing device of FIG. 2 and which includes hardware and/or software to facilitate digital identity operations in connection with an identity and access management hub (IAMH)

FIG. 3 illustrates a block diagram of the communication device 140 and, in particular, a functional diagram of certain components provided in software and hardware therein. As explained above, the communication device 140 may include a tablet, smartphone, laptop, server, or other computing device (e.g., consistent with the computing device 200). In general, the communication device 140 may include a portable communication device, which is portable with a user to be carried (conveniently) from place to place.

As shown in FIG. 3, the communication device 140 includes a mobile software development kit (SDK) 302 integrated and/or embedded into one or more mobile applications at the communication device 140 (e.g., mobile application 318, etc.). For example, the SDK 302 may be included in a financial services application, such as, for example, a mobile banking application, etc., or other application, in which the identity of the user associated with the device 140 may be authenticated, or an operation may be authorized based on an identity and/or identity attribute of the user, etc. The SDK 302 is provided by and/or from the host of the IAMH 102, for example, for use by a developer associated with the one or more mobile applications (such as mobile application 318), whereby the features of the SDK 302 are embedded into the one or more applications for use in the communication device 140.

In this exemplary embodiment, the SDK 302 includes an SDK API module 304 for use in calling one or more APIs associated with the IAMH 102 (via the business layer 112), and a secure hardware module 306 between the SDK 302 (e.g., white-box cryptography (WBC) SDK, etc.) and a trusted execution environment (TEE), which is included in the operating system of the communication device 140. The TEE is a secure area of the main processor of the operating system where code and data loaded inside is protected with respect to their integrity and confidentiality. This may be provided through software and/or hardware implementations in the communication device 140, such that trusted applications executed in the TEE are permitted to access the main processor and memory, while hardware inhibits access by apps running in a main operating system. User PII, such as biometric references, and other attributes of the digital identity (e.g., government ID numbers, birthdate, name, address, etc.) of the user, may be stored in the communication device 140 in the TEE.

The SDK 302 further includes a device security and cryptography module 308, which is configured to implement message level security logic (in addition to transport layer security) between the communication device 140 and the IAMH 102 (and, specifically a mobile back end included therein). The device security and cryptography module 308 is also configured to interface with the secure hardware module 306 (e.g., the TEE and a WBC SDK, etc.), thereby providing hardware based cryptography functions such as symmetric key generation, public-private key pair generation (e.g., in accordance with the Elliptic curve Diffie-Hellman (ECDH) protocol, the Rivest-Shamir-Adleman (RSA) protocol, etc.), encryption, decryption and message attestation, etc.

Also, as shown in FIG. 3, the SDK 302 includes a code fusion module 310 for integration of multiple SDKs, including a device fingerprint and fraud scoring module 312, a biometric module 314, and a document integrity check module 316.

The device fingerprint and fraud scoring module 312 is configured to communicate with the respective services at the IAMH 102 or secondary hubs 134 and/or 136 (as required or based on the location of the communication device 140). In short, the module 312 is configured to call the respective services through an API, whereby the SDK 302 acts at the communication device 140 as a front end for the respective services (as tied to the digital identity features described herein). The biometric module 314 is configured to capture a biometric from the user, at the communication device 140 (or other device), to extract features of the biometric (e.g., via fingerprint feature extraction, etc.), and then to compare the biometric (or biometric feature(s)) to one or more reference biometrics stored and/or included in the TEE. And, the document integrity check module 316 is configured to check the integrity of a document, by communicating with the specific value-added service(s) 132 at the IAMH 102 or one or more of secondary hubs 134 and/or 136 (as required or based on the location of the communication device 140).

Referring again to FIG. 1, in response to a user access request at a relying party, such as, for example, the relying party 106, the platform business layer 112 is configured to process the relying party policies and federation and SSO messages between the relying party application (included in the relying party 106) and the IAMH 102. The request may be related to a request to authenticate the user, a request to authorize the user, and/or a request to provide an attribute of the digital identity of the user (e.g., where the attribute may be relevant or usable in an interaction between the user and the relying party 106, etc.).

The IAMH 102 (or one or more of the secondary hubs 134 and 136, depending on a location of the user, etc.) is configured to receive the request from the user and/or the relying party 106 (via the platform business layer 112) and to validate the relying party policies. The IAMH 102 (or one or more of the secondary hubs 134 and 136) is further configured to collect identity claims, from the claim providers (e.g., via the REST API module 138, etc.), based on the policies, and then issue identity authentication and/or authorization tokens. Additionally, or alternatively, the IAMH 102 (or one or more of the secondary hubs 134 and 136) may be configured to provide additional claims back to the relying party application. The policies may be validated or enforced by the IAMH 102 (or the secondary hubs 134 and/or 136) based on data control policies, such as an "on-soil" limitation, etc., whereby a request from the user and/or the relying party 106 relating to data associated with a digital identity of the user is declined when in violation of the policies (e.g., at the relying party application or, in other examples, the relying party website, etc.).

The relying party application may utilize additional services, for example, the value-added services 132, through the IAMH 102 (or the secondary hubs 134 and/or 136). The value-added services 132 will be based on one or more digital identity and core payment platform assets, which are configured to provide respective claims via the REST API module 138 (e.g., REST services, etc.) in response to the request from the relying party application. What's more the REST API module 138 may be configured to provide custom REST services and/or claim providers that are not included in the value-added services 132.

In the exemplary embodiment of FIG. 1, the value-added services 132 include a data fraud scoring service, which is configured to provide fraud detection, fraud scoring and fraud solutions to mitigate identity fraud (e.g., synthetic identity fraud, etc.). In particular, the fraud scoring service is configured to output and/or provide claim(s) based on the confidence score of the communication device 140, the user, and/or authentication context data. The fraud scoring service is configured to consume data captured from the communication device 140, via the SDK 302 of FIG. 3, for example (e.g., SDK for JavaScript®, etc.). Through the fraud scoring services, the IAMH 102 may be configured to cooperate with the relying party (e.g., relying party 106, etc.), for example, to provide user interactions that are generally frictionless (e.g., frictionless authentication (e.g., limited user required activities), etc.) when the fraud or confidence score is of a particular value or above or below a specific threshold, and then to request/require explicit authentication when the fraud or confidence score is of a different particular value, or above or below the specific threshold or a different threshold. In addition, the fraud or confidence score may be passed, by the IAMH 102, to the relying party (e.g., relying party 106, etc.), for example, as additional meta-data in connection with an explicit authentication.

Figure 4:
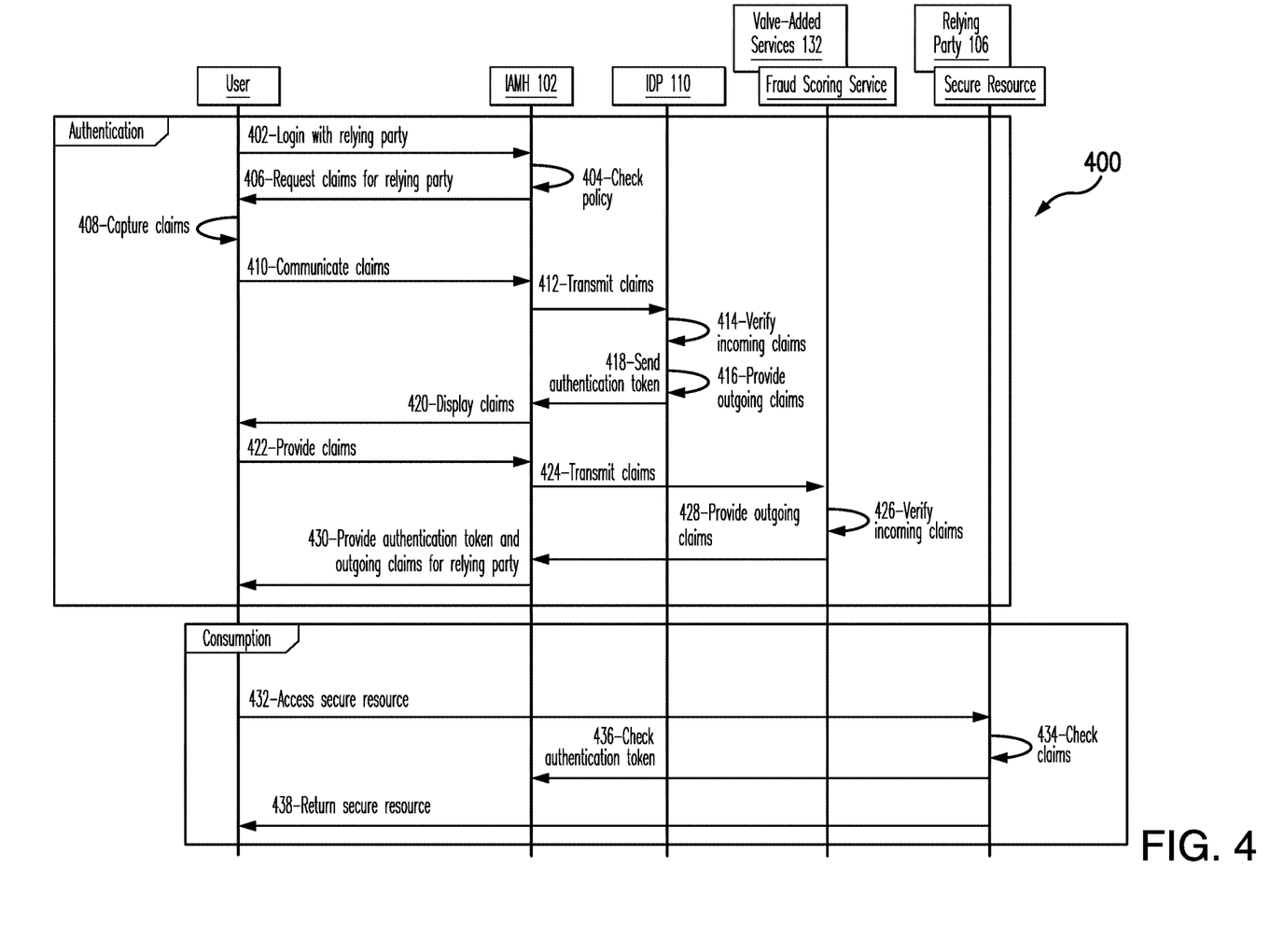
FIG. 4 includes a flow diagram of an exemplary method, which may be implemented in connection with the system of FIG. 1, for providing a fraud score in connection with a user interaction at a relying party, and specifically, at a relying party application.

FIG. 4 illustrates an exemplary method 400 for use in providing a fraud score in connection with a user interaction at a relying party, and specifically a relying party application. The exemplary method 400 is described herein in connection with the system 100, and may be implemented, in whole or in part, therein. Further, for purposes of illustration, the exemplary method 400 is also described with reference to the computing device 200 of FIG. 2 and the communication device 140 (as also illustrated in FIG. 3). However, it should be appreciated that the method 400, or other methods described herein, are not limited to the system 100, the computing device 200, or the communication device 140. And, conversely, the systems, data structures, computing devices, and communication devices described herein are not limited to the exemplary method 400.

At the outset, through the communication device 140, the user accesses and attempts to login to a website, at 402 (e.g., via the mobile application 318 or otherwise, etc.), where the website is associated with the relying party 106 integrated with the IAMH 102. The login request is directed, through the website, to the IAMH 102. At 404, the IAMH 102 checks the policy or policies associated with the relying party 106, which in this example, are enforced by the IDP 110 (in Region B). Then, at 406, the IAMH 102 shows the user, via the website (e.g., at the output device 206 of the communication device 140, etc.), a user interface (UI) to capture claims for the IDP 110 (e.g., login credentials for the website associated with the relying party 106, one or more aspects of the user's digital identity, etc.), thereby soliciting the claims from the user. The relying party 106, through the website, at the communication device 140 then captures the claims, at 408 (e.g., via the input device 208 of the communication device 140, etc.), from the user and communicates the claims, at 410, to the IAMH 102. It should be appreciated that, if the user's requested action is in violation of the determined policy, the IAMH 102 may simply provide a decline to the user.

At 412, the IAMH 102 transmits the claims to the IDP 110 (e.g., via the secondary hub 136, etc.). In response, the IDP 110 verifies the incoming claims, at 414 (e.g., including one or more aspects of the digital identity of the user, etc.), and (optionally) provides outgoing claims (e.g., results of the verification, etc.), at 416. Then, at 418, the IDP 110 sends an authentication token to the IAMH 102 (e.g., via the secondary hub 136, etc.), which, in turn, shows the user, via the UI of the website (or another UI), the fraud scoring claims, at 420 (e.g., a request for fingerprint data, etc.). In this example, the fraud scoring claims (e.g., fingerprint data, etc.) may be generally specific to and/or used as data relied upon by the fraud scoring services to generate the fraud score. The user then provides the claims (e.g., fingerprint data, etc.), in response, to the IAMH 102, at 422. The IAMH 102, in turn, then, transmits the claims to the value-added services 132, at 424, and specifically the fraud scoring service associated therewith. The fraud scoring service then verifies the incoming claims, at 426, and (optionally) provides a fraud score, (broadly, an outgoing claim representative of the fingerprint match, etc.) to the IAMH 102. And finally, at 430, the IAMH 102 provides an authentication token and the outgoing claims from the IDP 110 (relating to the fraud score from the fraud scoring service) to the user.

Then in the method 400, the user accesses the relying party website (or mobile application), via the communication device 140, whereupon the user attempts to access a secure resource (e.g., account data, etc.) associated with the relying party 106, upon access to the website (or mobile application). To do so, the user provides the authentication token and one or more outgoing claims (e.g., the fraud score, etc.) to access the secure resource, at 432, whereupon the relying party 106 checks the claims, at 434, and checks the token, at 436, with the IAMH 102. In turn, when the claims and authentication token are confirmed, the secure resource is returned to the relying party website (or mobile application) at the communication device 140, at 438.

While the fraud scoring service is described above with reference to the website of the relying party 106, it should be appreciated that the fraud scoring service may be provided in a similar manner through a mobile application associated with the relying party 106 (or a website and/or mobile application associated with the relying party 104), through the SDK 302 of the communication device 140, as illustrated in FIG. 3, for example.

In addition herein, the value-added services 132 may provide a document verification proofing service, which is configured to provide claims on validation of documents and other identity attributes. The attributes may be captured, for example, at the communication device 140, via the SDK 302 or other suitable SDK. The document verification proofing service may be configured to be leveraged by the relying party 106 (or the relying party 104) to create a digital identity, or to validate the user's new account opening request or remote know-you-customer (KYC) request.

Figure 5:
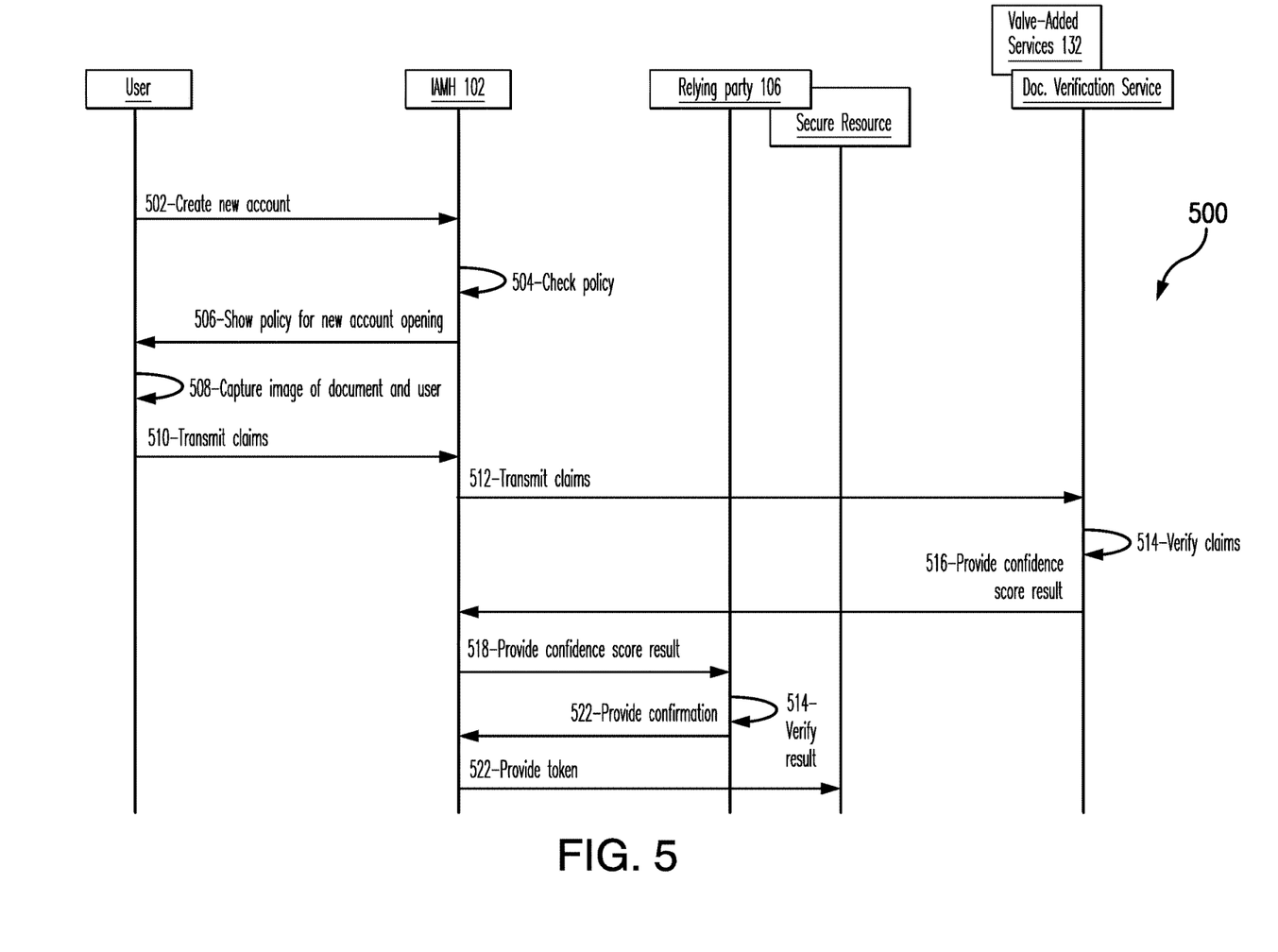
FIG. 5 includes a flow diagram of an exemplary method, which may also be implemented in connection with the system of FIG. 1, for providing verification of claims related to validation of documents and other identity attributes.

In connection therewith, FIG. 5 illustrates an exemplary method 500 for use in providing verification of claims related to validation of documents and other identity attributes. The exemplary method 500 is described herein in connection with the system 100, and may be implemented, in whole or in part, therein. Further, for purposes of illustration, the exemplary method 500 is also described with reference to the computing device 200 of FIG. 2 and the communication device 140 (as also illustrated in FIG. 3). However, it should be appreciated that the method 500, or other methods described herein, are not limited to the system 100, the computing device 200, or the communication device 140. And, conversely, the systems, data structures, computing devices, and communication devices described herein are not limited to the exemplary method 500.

Specifically, in this exemplary embodiment, the user attempts to create an account, for example, at the relying party 106, at 502, through a website or mobile application associated therewith (e.g., through the mobile application 318 at the communication device 140, etc.). In turn, the IAMH 102 checks the policies associated with the relying party 106, at 504, and then, at 506, shows the user, via a UI of the website (or, alternatively, via the mobile application 318) the relying party (via the output device 206 of the communication device 140, etc.), policy for the new account opening, thereby soliciting the claims from the user. The website, as provided at the communication device 140, then captures the claims associated with the policy of the relying party 106 (via the input device 208), at 508, as an image of the physical document indicative of an identity of the user (which includes a photo or image of the user or other biometric of the user) and an image of the user (e.g., a selfie, etc.) of the face of the user (or other biometric of the user), etc. The images (broadly, claims) are then transmitted, through the website, to the IAMH 102, at 510.

In particular in this example, the policy check (at 504) relates to the potential implication of the IDP 110 in Region B, based on involvement of the relying party 106. For instance, and as shown in FIG. 1, in connection with the desire (at 502) of the user to create the new account with the relying party 106, a request may be directed to the IDP 110 through the IAMH 102 (e.g., through the IAMH 102 and the secondary hub 136, in route to the IDP 110; etc.) as part of verifying the identity of the user (e.g., at 514 in connection with the document verification service of the IAMH 102 verifying the given claim with regard to the user, etc.). When/if the request is made, it would cross the regional boundary into Region B, whereby the IAMH 102 (and, more particularly, the implicated document verification service associated therewith) would then apply the determined policies for the verification (e.g., on-soil policies for Region B, etc.), based on the policy check (at 504) (along with any corresponding restrictions on PII associated with the Region B). With that said, the policy check may be performed at the IAMH 102 in general (depending on the region of the IAMH 102 and the given IDP), or in the region of the request, or in the region of the IDP 110 (e.g., via the secondary hub 136 in Region B in the above example, etc.). It should be appreciated that, if the user's requested action is in violation of the determined policy, the IAMH 102 may simply provide a decline to the user.

Then in the method 500, at 512, the IAMH 102 transmits the claims to the document verification proofing service (broadly, one of the value-added services 132). In response, the document verification proofing service verifies the incoming claims (e.g., the incoming images, etc.), at 514 (either on its own or in communication with the IDP 110). The document verification proofing service then generates a confidence score based on the match between the images, and, at 516, provides a result of the verification (including the confidence score in the result) to the IAMH 102. In response, the IAMH 102, at 518, transmits the claims (the images, the result and/or the confidence score) to the relying party 106. The relying party 106 then verifies the incoming claims, at 520, thereby approving the result and/or the confidence score in the result (e.g., relative to a threshold, etc.). Thereafter, the relying party 106 provides a confirmation, at 522, to the IAMH 102 (or the IAMH 102 verifies the claims independently), and then, at 524, the IAMH 102 provides a token representative of the authentication and/or verification of the physical document (as identified to the user) to the secure resource, which, in this example, includes the website (or mobile application) of the relying party 106.

With that said, it should be appreciated that the relying party 106 (and/or the relying party 104) may further impose a customer policy related to document verification in the IAMH 102, and more particularly, the value-added services 132.

With reference again to FIG. 1, the value-added services 132 include a biometric authentication service, which is configured to provide claims on local biometric authentication that may be Fast Identity Online (FIDO)-based or otherwise. The biometric service is configured to communicate with a specific biometric authentication server (e.g., a FIDO server, etc.), to procure the authentication result of biometrics. The biometric authentication service is configured to facilitate use cases, such as, for example, biometric authentication to log in a user, biometric authentication as consent to PII data sharing, etc.

Figure 6:
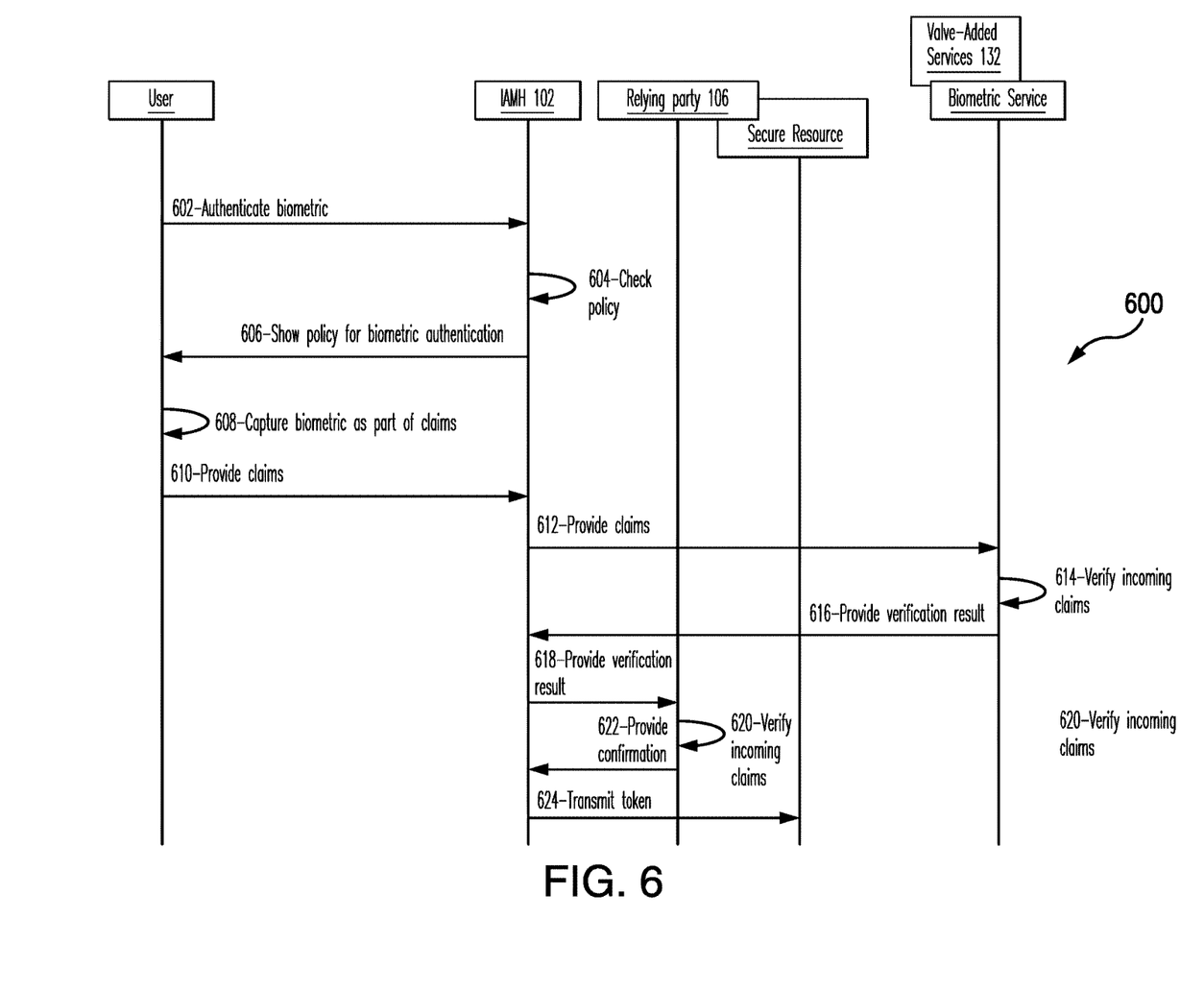
FIG. 6 includes a flow diagram of an exemplary method, which may be implemented in connection with the system of FIG. 1, for implementing biometric authentication of a user.

In connection therewith, FIG. 6 illustrates an exemplary method 600 associated with biometric authentication. The exemplary method 600 is again described herein in connection with the system 100, and may be implemented, in whole or in part, therein. Further, for purposes of illustration, the exemplary method 600 is also described with reference to the computing device 200 of FIG. 2 and the communication device 140 (as also illustrated in FIG. 3). However, it should be appreciated that the method 600, or other methods described herein, are not limited to the system 100, the computing device 200, or the communication device 140. And, conversely, the systems, data structures, computing devices, and communication devices described herein are not limited to the exemplary method 600.

Specifically, in this exemplary embodiment, the user attempts to authenticate his/her biometric, for example, as part of an interaction with the relying party 106, at 602, through a website or mobile application associated therewith (e.g., through the mobile application 318 at the communication device 140, etc.), in order to access an account, direct interactions associated with the account, and/or provide an attribute of an identity of the user, etc. In turn, the IAMH 102 checks the policies associated with the relying party 106, at 604, and then, at 606, shows the user, via a UI of the website (or, alternatively, via the mobile application 318) the relying party policy for biometric authentication (via the output device 206 of the communication device 140, etc.), thereby soliciting the claims from the user. The website, as provided by the relying party 106, at the communication device 140 (via the input device 208), then captures the claims at 608, which include a biometric of the user (e.g., a facial image, a fingerprint, etc.). The biometric (broadly, the claim) is then provided, through the website, to the IAMH 102, at 610.

At 612, the IAMH 102 provides the claims to the biometric authentication service (broadly, one of the value-added services 132). In response, the biometric authentication service verifies the claims (i.e., the biometric), at 614, and then, at 616, provides the verification result to the IAMH 102 (potentially including the biometric). In response, the IAMH 102, at 618, transmits the verification result to the relying party 106. The relying party 106 then verifies the claims, at 620, based on the verification result (e.g., confirms that the user has been biometrically verified, etc.). In connection therewith, the relying party 104 provides, at 622, a confirmation to the IAMH 102, and then the IAMH 102 provides a token, at 624, representative of the authentication and/or verification of the biometric (as identified to the user)

to the secure resource (as being requested by the user), which includes the relying party's website (or mobile application).

Again in this example, the policy check (at 604) relates to the potential implication of the IDP 110 in Region B, based on involvement of the relying party 106. For instance, and as shown in FIG. 1, in connection with the authentication attempt (at 602) of the user, a request may be directed to the IDP 110 through the IAMH 102 (e.g., through the IAMH 102 and the secondary hub 136, in route to the IDP 110; etc.) as part of verifying the biometric (e.g., at 614 in connection with the biometric service of the IAMH 102 verifying the given claim with regard to the user, etc.). When/if the request is made, it would cross the regional boundary into Region B, whereby the IAMH 102 (and, more particularly, the implicated biometric service associated therewith) would then apply the identified policies for the verification (e.g., on-soil policies for Region B, etc.), based on the policy check (at 604) (along with any corresponding restrictions on PII associated with the Region B). With that said, the policy check may be performed at the IAMH 102 in general (depending on the region of the IAMH 102 and the given IDP), or in the region of the request, or in the region of the IDP 110 (e.g., via the secondary hub 136 in Region B in the above example, etc.). It should be appreciated that, if the user's requested action is in violation of the determined policy, the IAMH 102 may simply provide a decline to the user.

In view of the above, the systems and methods herein provide IDaaS (Identity as a Service) for a relying party's website(s), mobile application(s) and cloud-based SaaS (software as a service) application(s), while also providing integrated solutions for certain services, such as, for example, tokenization, fraud scoring and ACH data. The systems and methods herein also permit and account for privacy and security, while providing easy and flexible deployment models for relying parties to efficiently onboard and provide better digital identity and other services to users, with frictionless experiences for the users.

Again and as previously described, it should be appreciated that the functions described herein, in some embodiments, may be described in computer executable instructions stored on a computer readable media, and executable by one or more processors. The computer readable media is a non-transitory computer readable storage medium. By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

It should also be appreciated that one or more aspects of the present disclosure transform a general-purpose computing device into a special-purpose computing device when configured to perform the functions, methods, and/or processes described herein.

As will be appreciated based on the foregoing specification, the above-described embodiments of the disclosure may be implemented using computer programming or engineering techniques including computer software, firmware, hardware or any combination or subset thereof, wherein the technical effect may be achieved by performing one or more of the following operations: (a) receiving, at an identity and access management hub (IAMH) computing device in a first region, a request related to a digital identity from a secondary hub disposed in a second region; (b) checking, by the IAMH computing device, a policy associated with the digital identity; (c) soliciting, by the IAMH computing device, at least one claim from a user, at a relying party application and/or website, based on the request; (d) providing the at least one claim to a value-added service associated with the IAMH for verification of the at least one claim; (e) transmitting, by the IAMH computing device, a result of the verification to a relying party associated with the request; and (f) providing, by the IAMH computing device, a token, in response to the request, to a secure resource associated with the relying party.

Exemplary embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular exemplary embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When a feature is referred to as being "on," "engaged to," "connected to," "coupled to," "associated with," "included with," or "in communication with" another feature, it may be directly on, engaged, connected, coupled, associated, included, or in communication to or with the other feature, or intervening features may be present. As used herein, the term "and/or" and the phrase "at least one of" includes any and all combinations of one or more of the associated listed items.

Although the terms first, second, third, etc. may be used herein to describe various features, these features should not be limited by these terms. These terms may be only used to distinguish one feature from another. Terms such as "first," "second," and other numerical terms when used herein do not imply a sequence or order unless clearly indicated by the context. Thus, a first feature discussed herein could be termed a second feature without departing from the teachings of the example embodiments.

None of the elements recited in the claims are intended to be a means-plus-function element within the meaning of 35 U.S.C. § 112(f) unless an element is expressly recited using the phrase "means for," or in the case of a method claim using the phrases "operation for" or "step for."

The foregoing description of exemplary embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A computer-implemented method for use in managing digital identities in multiple different countries, through multiple identity providers, while providing for policy enforcement of the different countries in connection with the digital identities, the method comprising:
receiving, at an identity and access management hub (IAMH) computing device in a first country, a request related to a digital identity from a secondary hub disposed in a second country, the second country different than the first country;
checking, by the IAMH computing device, a policy associated with the digital identity and specific to the second country;
soliciting, by the IAMH computing device, at least one claim from a user, at a relying party application and/or a relying party website, based on the request;
providing the at least one claim to a value-added service associated with the IAMH computing device for verification of the at least one claim;
transmitting, by the IAMH computing device, a result of the verification to a relying party associated with the request; and
providing, by the IAMH computing device, a token, in response to the request, to a secure resource associated with the relying party.

2. The computer-implemented method of claim 1, further comprising:
soliciting, by the IAMH computing device, at least one initial claim associated with the request from the user; and
transmitting, by the IAMH computing device, the at least one initial claim to the relying party, prior to soliciting the at least one claim from the user.

3. The computer-implemented method of claim 1, further comprising providing a decline to the user, at the relying party application and/or website, when the request relates to data associated with the digital identity in violation of the policy.

4. The computer-implemented method of claim 1, wherein the value-added service includes one of a fraud scoring service, a biometric service and a document verification service.

5. The computer-implemented method of claim 1, wherein the value-added service includes one of a fraud scoring service; and
wherein the result includes a score associated with the request.

6. The computer-implemented method of claim 1, wherein the value-added service includes a document verification service; and
wherein the claim includes an image of a physical document and the result includes a score associated with the verification of the physical document against a reference.

7. The computer-implemented method of claim 1, wherein the request includes a request to authenticate the user.

8. The computer-implemented method of claim 1, wherein the request includes a request for an attribute of the digital identity of the user.

9. A system for use in managing digital identities in multiple countries, through multiple identity providers, while providing for policy enforcement in connection with the digital identities, the system comprising:
an identity and access management hub (IAMH) computing device disposed within a first country; and
at least one secondary hub computing device coupled in communication with the IAMH computing device and in communication with an identity provider (IDP) computing device including a digital identity of a user, the secondary hub computing device and the IDP computing device disposed in a second country different than the first country;
wherein the IAMH computing device is configured to receive a request related to the user, the request including a request to authenticate the user, to authorize the user and/or for an attribute of the digital identity of the user; and
wherein at least one of the IAMH computing device and the secondary hub computing device is configured to apply at least one policy specific to the second country to the request, thereby enforcing the at least one policy for the request across the first and second countries.

10. The system of claim 9, wherein the policy includes a limitation associated with transmission of personal identifying information (PII) associated with the request, from the first country to the second, different country.

11. The system of claim 9, wherein the at least one of the IAMH computing device and the secondary hub computing device is configured to limit the request based on the policy; and
wherein the IAMH computing device is configured to:
when the request violates the at least one policy, decline the request; and
when the request conforms to the at least one policy, communicate at least one claim associated with the request to the IDP computing device and display the at least one claim, to the user as a website associated with a relying party interacting with the user, in response to an authentication token from the IDP computing device received in response to the communicated at least one claim.

12. The system of claim 9, wherein the IAMH computing device is further configured to provide at least one claim to a value-added service and to provide an authentication token to a relying party interacting with the user in response to a verification of the at least one claim by the value-added service.

13. The system of claim 12, wherein the value-added service includes a fraud scoring service associated with the IAMH computing device.

14. The system of claim 9, wherein the request is for the attribute of the digit identity of the user.

15. The system of claim 9, wherein the IAMH computing device is further configured to provide at least one claim to a value-added service associated with the IAMH computing device and to provide a confidence score to a relying party interacting with the user upon receipt of the confidence score from the value-added service.

16. The system of claim 15, wherein the value-added service includes a document verification service; and wherein the at least one claim includes an image of a physical document representative of an identity of the user.

\* \* \* \* \*